United States Patent Office 3,492,395
Patented Jan. 27, 1970

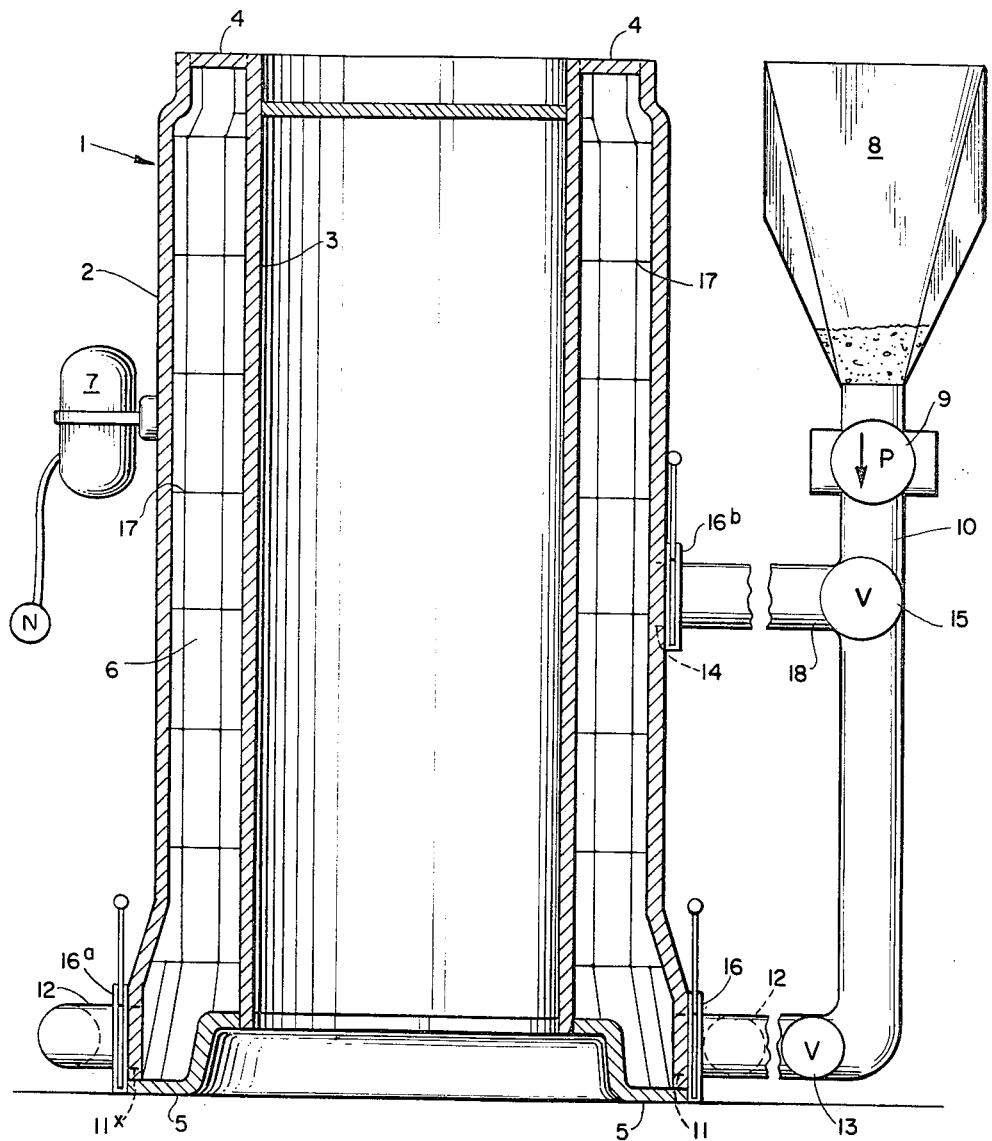

3,492,395
METHOD FOR PRESSURE MOLDING HOLLOW CYLINDRICAL STRUCTURES
Thomas K. Breitfuss, Denver, Colo., assignor to Hydro Conduit Corporation, Denver, Colo., a corporation of Delaware
Filed July 1, 1966, Ser. No. 562,342
Int. Cl. B28b 21/02
U.S. Cl. 264—308                4 Claims

ABSTRACT OF THE DISCLOSURE

A method is provided for casting cylindrical structures, such as concrete pipe, wherein plastic material is force fed under pressure into an annular mold cavity closed on its sides and bottom. The introduction is carried out in an ascending sequence through a plurality of inlets located at different elevations in the mold, at least one of which is adjacent the bottom of the mold cavity. Progressive introduction of the material beneath previously introduced material is continued under sufficient pressure to elevate previously introduced material as a cohesive mass throughout the cross sectional extent of the mold after the fill has reached the level of the inlet next above. Such process prevents material segregation and prevents the entrapment of air in the material.

---

This invention relates to a method of and apparatus for casting hollow cylindrical structures and more particularly concrete pipe or shapes.

Until now, commercial manufacture of cylindrical shapes of precast concrete in upright molds has involved introducing a mixture of sand, stone, cement and water into the top portion of the mold allowing the mixture to drop into place and flow by gravity around the reinforcing material and against the forming contours. As the mixture drops and hits the sides and bottom of the mold, segregation of the aggregates and cement occurs and air is entrained or entrapped in the fallen material.

Such segregation and entrapment is further aggravated as the mixture strikes reinforcing materials, such as steel cages, disposed between the forms or mold members. The segregation and air entrapment results in a non-uniform mixture which detracts from the final strength of the formed product and may result in a partially "honeycombed" structure. The latter condition produces an undesirable appearance and allows entry or passage of water or other leaching material into the interstices of the structure with undesirable or detrimental results.

The entrapment of air below the surface of the mixture requires extensive jolting or vibration of the forms and/or mixture itself to release the air, and air release is necessary to produce a uniformly dense structure with a minimum of dimples in the surface. Such dimples detract from appearance and sometimes impair hydraulic efficiency; also in sewer lines, are possible pools for septicity.

The practice of my invention represents a departure from prior art procedures by providing an effective and economical method of delivering a cementitious charge into an upright mold and of distributing the charge therein without segregation of materials and with air entrapment effectively eliminated. The hollow cylindrical structures and shapes produced by the new method result in a structure of substantially uniform density having a minimum of surface dimples.

The invention also includes a novel arrangement of apparatus components which are durable and economical to operate and greatly reduce equipment requirements, operating time and labor costs. It also has the advantage of being able to utilize accepted mold contours for producing desired shapes and provides continuous casting.

Accordingly, it is an object of my invention to provide a simple, economical and efficient method of forming or casting hollow cylindrical structures continuously which are of substantially uniform density throughout and substantially free from surface dimples.

Another object of my invention is to provide a rapid and inexpensive method of casting hollow cylindrical structures in upright molds in which segregation of materials and air entrapment are substantially eliminated.

A further object of my invention is to use a simple, durable and efficient upright mold assembly for casting hollow cylindrical structures in a continuous action which provides forceful removal of entrained air and prevents segregation of materials in the charge fed to the mold.

Still another object of my invention is to use simple, durable and efficient apparatus for casting concrete pipe and similar shapes which effectively maintains a cohesive mass of material in the mold during the casting and operation and provides a complete and intimate surrounding of the reinforcing material therein.

Other objects and advantages reside in novel details of construction and novel combinations and arrangements of parts, all of which will be set forth in the course of the following description.

The practice of my invention will be described with reference to the accompanying drawing, illustrating in more or less schematic manner the operating procedure and a typical structural arrangement for performing the novel method. The single figure of the drawing represents a vertical section through an upright mold with charging facilities and other components shown in operating association therewith.

The assembly shown comprises an upright mold structure designated generally by reference numeral 1 comprising an outer member or walls 2 and inner walls or member 3 having a closed bottom portion 5 which may be secured between the walls 2 and 3 or separable as shown at 5. The top portion 4 also may be closed except for holes or a valve for releasing air, or it may be left open as indicated by the dash lines indicating omission of top portion 4. The space 6 between the inner and outer wall members comprises the mold cavity and may be cylindrical or generally cylindrical with special shaping of the end portions as for forming bell and spigot portions on concrete pipe. Where desired, a vibrator mechanism 7 may be provided and is here shown as mounted on an outer wall portion 2. A supply source 8 of suitable capacity is located adjacent mold 1 and a pressure system 9 delivers feed through a conduit 10 under pressure.

As shown, conduit 10 extends to a feed opening 11 in the lower part of the mold and may have a branch 12 extending around the mold to a second inlet position 11x distance from inlet 11. A valve 13 permits selective delivery of feed through inlets 11 and 11x or may be opened so that feed passes through both at the same time. Where an elongated mold structure is used, it may be preferable to have another inlet passage 14 located at a suitable elevation intermediate the ends of the mold and a valve 15 is operated to close the flow of material from pump 9 or to selectively pass the flow of feed to inlet 11 or to terminate feed to inlet 11 and direct it through inlet 14. Gate valves such as the gate members 16, 16a or 16b are provided to close the respective inlet openings 11, 11x and 14 when the mold cavity is filled or when the mold cavity is filled to the level of inlet 14.

In performing the method of my invention, an arrangement of reinforcing structure 17, usually in a cage-like arrangement, is disposed in space 6 before the end of the mold structure is closed as shown in the drawing. The valve and gate arrangement previously described may be utilized for several filling procedures as through a lower inlet only, an upper inlet only, two bottom inlets simultaneously or any combination of the foregoing. Open gates are closed as filling reaches an elevation above gate level or when the cavity is filled by feed introduced through a single inlet. Pressure system 9 is operated to draw cementitious mixture from hopper 8 and discharge it under substantial pressure through inlet 11 or any other open inlet into space 6. This supply of feed is introduced in an operation continuous enough to prevent hardening of the mixture or friction stoppage, and the incoming material deposits under previously introduced material elevating the latter progressively through the space 6.

In an action in which feed is introduced only through inlet 11, contained air in cavity 6 is driven vertically ahead of the advancing mixture and entrapment of air is minimized. The elevating action on previously introduced material also serves to avoid segregation of materials by maintaining a cohesive mass throughout the casting operation. The elevating material moves into complete and intimate surrounding of the reinforcing structure as it passes by it and when the material introduction reaches the top of the mold, all the contained air in the mold at the start of the filling operation has been driven off through the open end or relief valve, or other opening provided for air escape.

An alternative of the foregoing arrangement is to charge the cavity of the mold by an initial introduction of the feed through inlets 11 and 11x at the bottom of the mold. When the elevating movement of the cohesive mass reaches the elevation of branch conduit 18, valve 15 moves to first close the delivery of material from pressure system 9 to deliver the final feed through inlets 11 and 11x, after which gate valves 16 and 16a are closed to prevent outflow of the material so introduced. Valve 15 then moves to direct the flow from pressure system 9 through branch 18 into inlet 14 and thus continues the movement of the previously introduced material in an ascending flow until the cavity fill is complete to its top. While only two filling levels have been shown in the drawing, it will be apparent that where a cavity of extra length is being utilized, filling inlets may be provided at more than one level above the bottom inlet or inlets. In such case, the filling will continue through the succession of introductions until the mold cavity has been progressively filled from bottom to top.

Another filling procedure is to utilize a single inlet such as 14 at a substantially higher elevation than the bottom. The initial flow of material goes to the bottom and any entrained air is pressed from the feed material by the pressure applied to the top of the fill. The initial mixture so introduced embeds the lower part of the reinforcing cage, thereby anchoring it and resisting any tendency to elevate it during progression of the filling.

The introduction of incoming feed at a lower elevation to elevate previously introduced feed to a higher elevation maintains the cohesive character of the material in the mold cavity and effectively prevents segregation of materials. As the filling progresses, the mold may be subjected to vibratory influences as by operation of the vibrator assembly 7 and by the time the charging of the mold cavity is completed, the material so introduced will become self-sustaining within a very short time and stripping of the mold from the formed structure can begin so as to make the mold components available for the next charging operation. Stripping practices of this type are well known in the art and the present drawing does not disclose any arrangement for stripping.

When a mold of the type shown in the drawing is used in the practice of my invention, it usually will have the top portions 4 between the dash lines removed, or, in the alternative, slots or openings may be formed in the top covering surface to permit escape of air as the cavity is filled and also to permit a visual determination of the complete fill of the mold cavity. Otherwise, a relief valve may be provided which will permit escape of the air and also indicate when the mold cavity is completely filled by escape of some of the fluid material of the charge as the fill reaches the top covering portion. Whenever the mold is filled, the charging operation will be terminated quickly and the inlet or inlets will be closed to retain the entire charge in the mold.

Whenever the mold cavity has been filled by any of the procedures hereinbefore described, the formed structure has a surface substantially free from dimples and is generally smooth with no cavities or depressions in which liquid will collect. "Honeycomb" effect is eliminated by maintaining the cohesive charge during the forming procedure and the material of the formed structure is of essentially uniform density throughout its lengthwise and circumferential extent.

The practice of the present invention also may be applied to elongated molds having their lengthwise axes horizontally disposed. The mold cavity for such an arrangement will be closed on the sides and at both ends and a filling inlet will be provided adjacent one end or at one or more locations intermediate the ends. An opening or relief valve is provided at the top of the mold cavity in one or more locations indicating completeness of fill. A pressure system of the type previously described will introduce the feed material through the inlet in a flow which may be directed radially or tangentially and after a partial fill has been introduced and allowed to flow along lines of least resistance, the continuing introduction of feed under pressure will elevate the previously introduced material until the entire cavity is filled. Complete filling will be indicated by the escape of material (usually bubbles) from the upper opening, at which time introduction of feed through the inlet will terminate and the inlet opening will be closed.

At the present time, industrial requirements sometimes call for a thin walled product. If a vertically disposed mold is used and gravity filling is employed as in the prior art practice, there is only a small space at the top of the mold cavity to admit the feed and filling thus becomes a slow procedure, particularly if the mold is a non-cylindrical shape, with all the attendant deleterious effects previously noted. In contradistinction, the utilization of the pressure system for filling cylindrical or noncylindrical molds in the various ways described hereinbefore permits utilization of thinner walls and a greater variety of shaping with less time required in the charging and with a higher density product resulting.

The charging practices just described are performed successively or continuously until the mold cavity is completely filled and as the total time required in stripping and foming the charge into a self-sustaining structure is quite brief, the amount of equipment required in a given plant is substantially less than in plants employing the earlier charging procedures and labor costs also are greatly reduced.

I claim:

1. The method of casting cylindrical structures, which comprises force feeding a plastic material under pressure into an annular mold cavity closed on its sides and bottom, said introduction being in an ascending sequence through a plurality of inlets located at different elevations in the mold, at least one of which is adjacent the bottom of the mold cavity, and continuing progressive introduction of plastic material beneath previously introduced material and under sufficient pressure to elevate the previously introduced charge as a cohesive mass throughout the cross sectional extent of the mold after the fill has reached the level of the inlet next above thereby removing entrained air and preventing material segregation, and terminating such introduction when the mold cavity is filled.

2. The method of casting cylindrical structures, which comprises force feeding a plastic material under pressure into an annular mold cavity closed on its sides and bottom, said introduction being in an ascending sequence through a plurality of inlets located at different elevations in the mold, the first introduction being into a lowermost inlet until the cavity fill reaches the elevation of the inlet next above, whereupon the plastic is introduced through the inlet next above, continuing progressive introduction of plastic material through said inlet next above beneath previously introduced material and under sufficient pressure to elevate the previously introduced charge as a cohesive mass throughout the cross sectional extent of the mold thereby removing entrained air and preventing material segregation, and terminating such introduction when the mold cavity is filled.

3. The method of casting cylindrical structures, which comprises force feeding a plastic material under pressure into an annular mold cavity closed on its sides and bottom, said introduction being in an ascending sequence through a plurality of inlets located at different elevations in the mold, the plastic material being introduced successively through the plurality of inlets from bottom to top with termination of such introduction to a lower inlet as the cavity fill reaches the elevation of the inlet next above, continuing progressive introduction of plastic material beneath previously introduced material and under sufficient pressure to elevate the previously introduced charge as a cohesive mass throughout the cross sectional extent of the mold thereby removing entrained air and preventing material segregation, and terminating such introduction when the mold cavity is filled.

4. The method of casting cylindrical structures, which comprises force feeding a plastic material under pressure into an annular mold cavity closed on its sides and bottom, said introduction being in an ascending sequence through a plurality of inlets located at different elevations in the mold, terminating feed introduction through the lower inlet and initiating introduction through an upper inlet when the elevated charge in the mold enclosure reaches an elevation above the upper inlet, continuing progressive introduction of plastic material beneath previously introduced material and under sufficient pressure to elevate the previously introduced charge as a cohesive mass throughout the cross sectional extent of the mold thereby removing entrained air and preventing material segregation, and terminating such introduction when the mold cavity is filled.

References Cited

UNITED STATES PATENTS

| 1,703,871 | 3/1929 | Curtis. | |
| 2,429,012 | 10/1947 | Zigenbein. | |
| 2,903,877 | 9/1959 | Meade | 264—35 X |

FOREIGN PATENTS

| 1,228,439 | 8/1960 | France. |

ROBERT F. WHITE, Primary Examiner

J. H. SILBAUGH, Assistant Examiner

U.S. Cl. X.R.

25—30; 264—32